(12) United States Patent
Loy

(10) Patent No.: US 6,938,192 B1
(45) Date of Patent: Aug. 30, 2005

(54) METHOD AND SYSTEM FOR INCREASING RELIABILITY OF DATA PACKET TRANSMISSION AGAINST IMPULSIVE NOISE IN POWERLINE COMMUNICATION SYSTEMS

(75) Inventor: Dietmar Loy, Sausalito, CA (US)

(73) Assignee: Broadband Energy Networks, Upper Darby, PA (US)

( * ) Notice: Subject to any disclaimer, the term of this patent is extended or adjusted under 35 U.S.C. 154(b) by 592 days.

(21) Appl. No.: 10/013,586

(22) Filed: Dec. 7, 2001

(51) Int. Cl.$^7$ .......................................... G01R 31/28
(52) U.S. Cl. .................................................. 714/712
(58) Field of Search ............................... 714/776, 709, 714/800, 712, 25, 817; 340/310.01–310.02; 329/318; 370/351

(56) References Cited

U.S. PATENT DOCUMENTS 5,355,114 A * 10/1994 Sutterlin et al. ....... 340/310.02

OTHER PUBLICATIONS

Friedman et al., error control on in-building power line communication channels, 1993, IEEE, p. 178-185.*

* cited by examiner

*Primary Examiner*—Shelly A Chase
(74) *Attorney, Agent, or Firm*—Sawyer Law Group LLP

(57) ABSTRACT

The present invention provides a method and system for increasing reliability of data packet transmission against impulsive noise in powerline communication systems. The method modulates copies of a data packet on two different frequencies, and transmits the modulated data packets along the powerline. One copy is transmitted shifted in time by at least one bit from the other copy. Thus, when an impulsive noise occurs along the powerline, the bits destroyed in the modulated first copy are different than the bits destroyed in the second copy. In this manner, the remaining bits in the first and second copies can be compared and used to reconstruct the data packet. The reliability of data packet transmission against impulsive noise is increased.

8 Claims, 4 Drawing Sheets

# METHOD AND SYSTEM FOR INCREASING RELIABILITY OF DATA PACKET TRANSMISSION AGAINST IMPULSIVE NOISE IN POWERLINE COMMUNICATION SYSTEMS

FIELD OF THE INVENTION

The present invention relates to powerline communication systems, and more particularly to impulsive noise in powerline communications systems.

BACKGROUND OF THE INVENTION

Impulsive noise on powerlines are well known in the art. However, it can be a problem when data packets are transmitted along these lines within communications systems. FIG. 1 illustrates a conventional data packet and impulsive noise along a powerline. The data packet 100 comprises a preamble 102, a destination address 104, a source address 106, a length/type 108, data of variable length 110, and frame check sequence (FCS) 112. However, when an impulsive noise 120 occurs on the powerline, one or more bits of the data packet 100 can be destroyed as it is transmitted along the powerline. For example, in FIG. 1, the impulsive noise 120 can cause two bits in the length/type field to be destroyed. Such destruction of bits cannot be corrected by performing the FCS error detection process. The FCS error detection process is well known in the art and will not be further described here. This limits the reliability of the data packets transmitted along the powerline.

Accordingly, there exists a need for a method and system for increasing reliability of data packet transmission against impulsive noise in powerline communication systems.

SUMMARY OF THE INVENTION

The present invention provides a method and system for increasing reliability of data packet transmission against impulsive noise in powerline communication systems. The method modulates copies of a data packet on two different frequencies, and transmits the modulated data packets along the powerline. One copy is transmitted shifted in time by at least one bit from the other copy. Thus, when an impulsive noise occurs along the powerline, the bits destroyed in the modulated first copy are different than the bits destroyed in the second copy. In this manner, the remaining bits in the first and second copies can be compared and used to reconstruct the data packet. The reliability of data packet transmission against impulsive noise is increased.

DETAILED DESCRIPTION

The present invention provides a method and system for increasing reliability of data packet transmission against impulsive noise in powerline communication systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
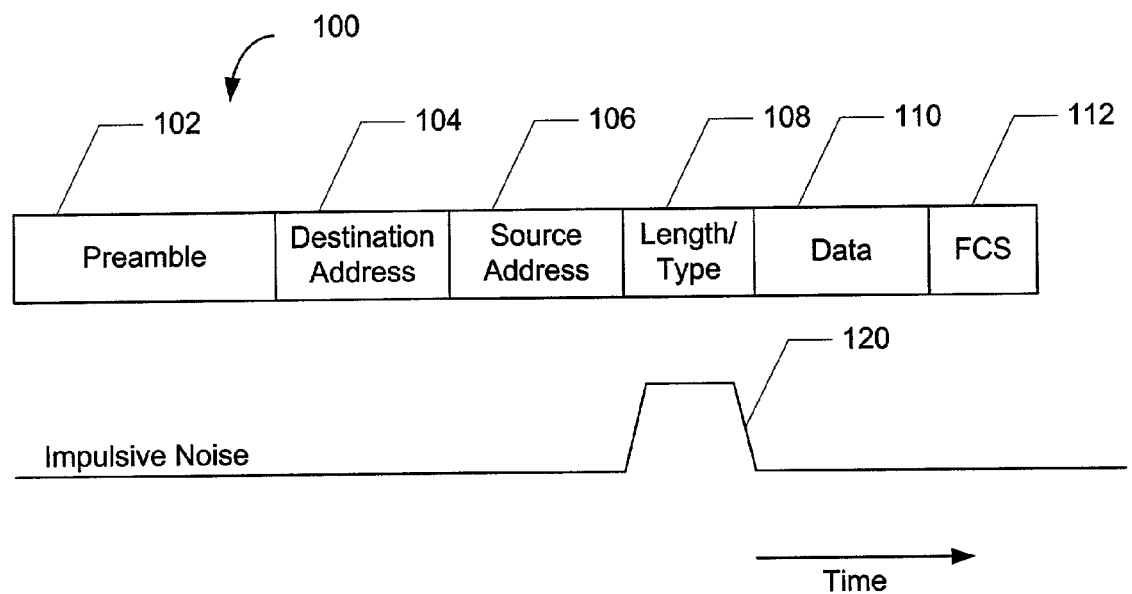
FIG. 1 illustrates a conventional data packet and impulsive noise along a powerline.
Figure 2:
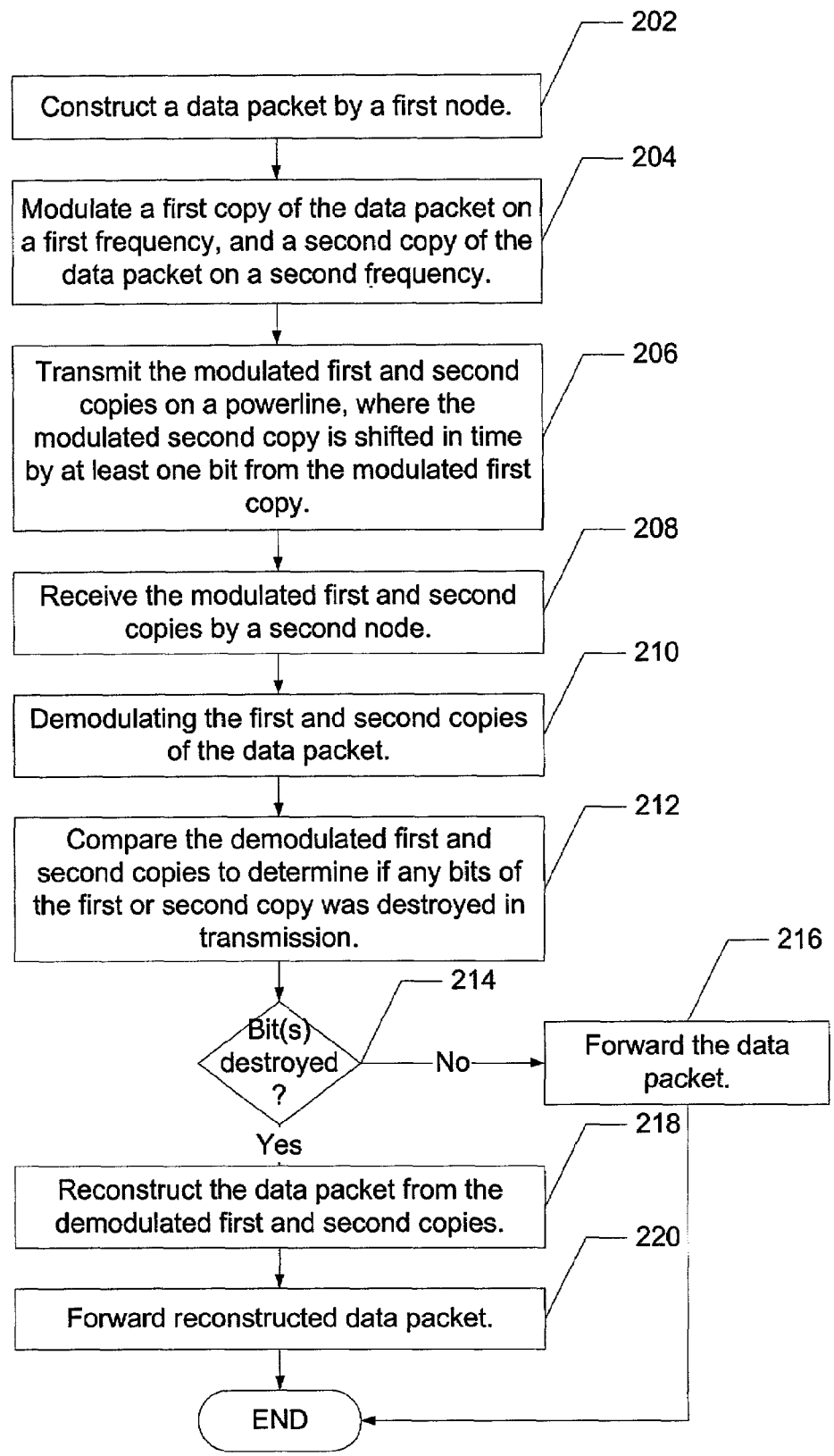
FIG. 2 is a flowchart illustrating a preferred embodiment of a method for increasing reliability of data packet transmission against impulsive noise in powerline communication systems.

FIG. 2 is a flowchart illustrating a preferred embodiment of a method for increasing reliability of data packet transmission against impulsive noise in powerline communication systems. First, a data packet is constructed by a first node, via step 202. Next, a first copy of the data packet is modulated on a first frequency, and a second copy of the data packet is modulated on a second frequency, via step 204. Both the modulated first and second copies of the data packet are transmitted on the powerline, via step 206, where the modulated second copy of the data packet is shifted in time by at least one bit from the modulated first copy of the data packet. Both the modulated first and second copies of the data packet are received by a second node, via step 208. The second node demodulates the first and second copies of the data packet, via step 210. The second node compares the bits in the demodulated first and second copies of the data packet to determine if any of the bits of the first or second copies of the data packet was destroyed in transmission, via step 212. If it is determined that any of the bits was destroyed, via step 214, then the second node reconstructs the data packet using the bits from the demodulated first and second copies of the data packet, via step 218. The reconstructed data packet is then forwarded to the next process, via step 220. Otherwise, the data packet from either the first or the second copy is forwarded without the need to reconstruct it, via step 216.

Figure 3:
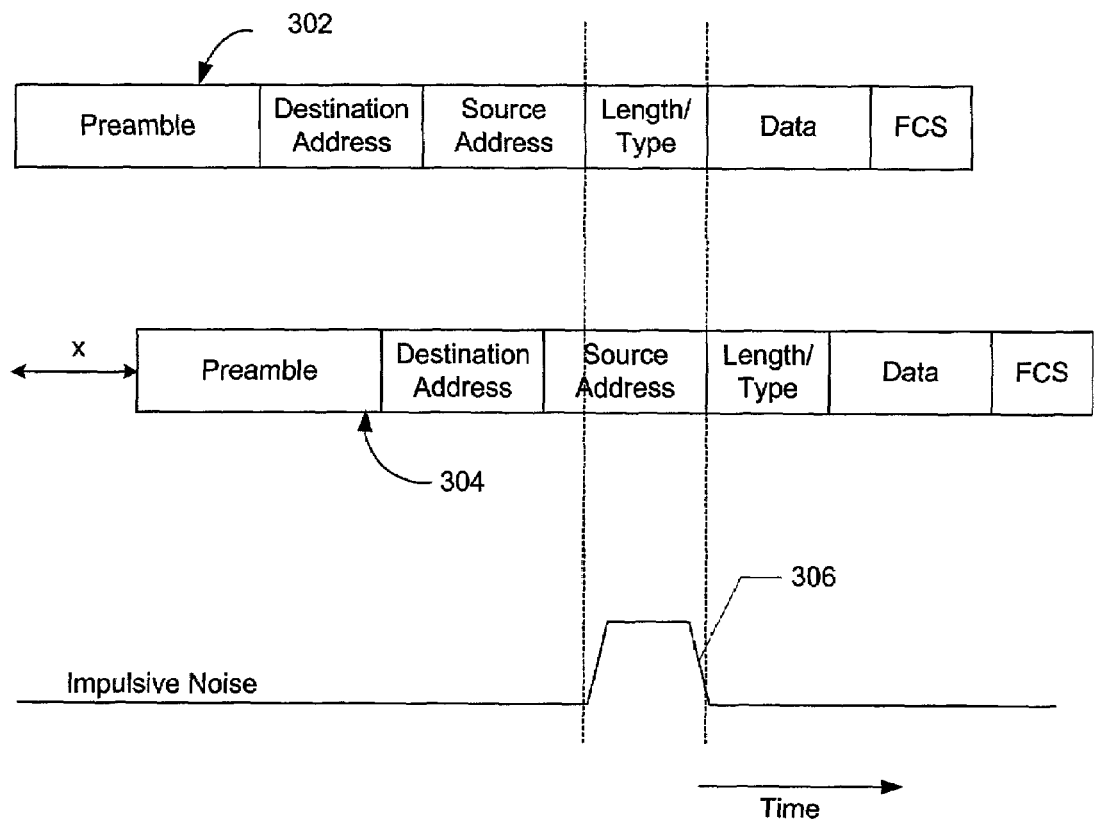
FIG. 3 illustrates the modulated copies of the data packets in accordance with the present invention.

FIG. 3 illustrates the modulated copies of the data packets in accordance with the present invention. The top diagram illustrates the first copy of the data packet 302 modulated on the first frequency, F1. The middle diagram illustrates the second copy of the data packet 304 modulated on the second frequency, F2. The bottom diagram illustrates an impulsive noise along the powerline at a particular time. The modulated second copy of the data packet 304 is shifted in time "x" by at least one bit from the modulated first copy of the data packet 302. Thus, when an impulsive noise 306 occurs along the powerline, the bits destroyed in the modulated first copy of the data packet 302 are different than the bits destroyed in the modulated second copy of the data packet 304. In this manner, the remaining bits in the modulated first 302 and second 304 copies of the data packet can be compared and used to reconstruct the data packet.

Figure 4:
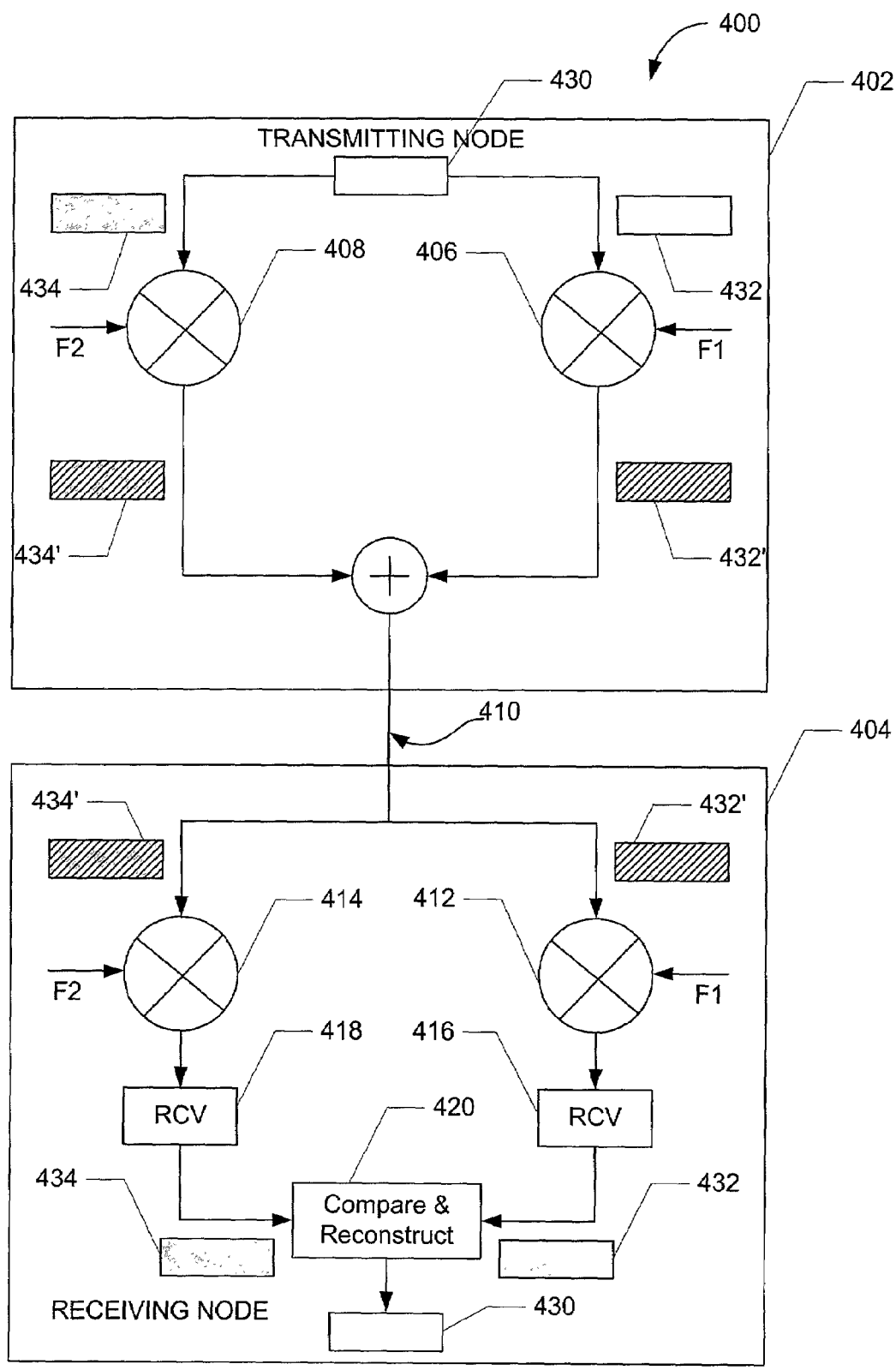
FIG. 4 illustrates a preferred embodiment of a system for increasing reliability of data packet transmission against impulsive noise in powerline communication systems.

FIG. 4 illustrates a preferred embodiment of a system for increasing reliability of data packet transmission against impulsive noise in powerline communication systems. The system 400 comprises a transmitting node 402 and a receiving node 404. The transmitting node 402 comprises a first modulator 406 for modulating data packets on a first frequency, F1, and a second modulator 408 for modulating data packets on a second frequency, F2. The receiving node 404 comprises a first demodulator 412 for demodulating data packets on F1, and a second demodulator 414 for demodulating data packets on F2. A first receiver 416 is coupled to the first demodulator 412 for decoding demodulated data packets on F1, and a second receiver 418 is coupled to the second demodulator 414 for decoding demodulated data packets on F2. Coupled to the first 416 and second 418 receivers is software and/or hardware 420 for comparing the data packets received on F1 and F2, and reconstructing the data packet if any of its bits had been destroyed during transmission.

Referring to both FIGS. 2 and 4, the transmitting node 402 first constructs a data packet 430, via step 202. The first modulator 406 modulates a first copy 432 of the data packet 430 on F1, via step 204. Also, the second modulator 408 modulates a second copy 434 of the data packet 430 on F2, via step 204. The modulated first copy 432' of the data packet 430 and the modulated second copy 434' of the data packet 430 are then transmitted along the powerline 410 by the transmitting node 402, via step 206. Importantly, the modulated second copy 434' of the data packet 430 is shifted in time by at least one bit from the modulated first copy 432' of the data packet 430, as illustrated in FIG. 3. Next, the modulated first 432' and second 434' copies of the data packet 430 are received by the receiving node 404, via step 208. The first demodulator 412 demodulates the first copy 432' of the data packet 430, and the demodulated first copy 432 of the data packet 430 is decoded by the first receiver 416, via step 210. Also, the second demodulator 414 demodulates the second copy 434' of the data packet 430, and the demodulated second copy 434 of the data packet 430 is decoded by the second receiver 418, via step 210.

The software/hardware 420 then compares the bits in the demodulated first 432 and second 434 copies of the data packet 430, via step 212. From this comparison, the software/hardware 420 determines if any of the bits in the first 432 or second 434 copies of the data packet 430 was destroyed during transmission. In the preferred embodiment, the comparison is performed using a bit-by-bit comparison of the first 432 and second 434 copies of the data packet 430. Alternatively, a parity bit may be added to the data packet 430 at regular bit intervals, such as every eight bits. The parity bits of these intervals are then checked. If any of these parity bits are wrong, then at least one bit within this interval had been destroyed. If it is determined that at least one bit of the data packet 430 was destroyed, via step 214, then the software/hardware 420 reconstructs the data packet 430 from the bits in the first 432 and second 434 copies of the data packet 430, via step 218. In the preferred embodiment, the reconstruction is performed by swapping different bits between the first 432 and second 434 copies of the data packet 430 until the FCS detection process indicates no errors. The FCS detection process is well known in the art and will not be further described here. The reconstructed data packet 430 is then forwarded, via step 220. If it is determined that no bits were destroyed, via step 214, then no reconstruction is required, and the data packet 430 from either the first 432 or second 434 copy is forwarded, via step 216.

A method and system for increasing reliability of data packet transmission against impulsive noise in powerline communication systems has been disclosed. The method modulates copies of a data packet on two different frequencies, and transmits the modulated data packets along the powerline. One copy is transmitted shifted in time by at least one bit from the other copy. Thus, when an impulsive noise occurs along the powerline, the bits destroyed in the modulated first copy are different than the bits destroyed in the second copy. In this manner, the remaining bits in the first and second copies can be compared and used to reconstruct the data packet. The reliability of data packet transmission against impulsive noise is increased.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for increasing reliability of data packet transmission against impulsive noise in powerline communication systems, comprising the steps of:
   (a) constructing a data packet by a first node;
   (b) modulating a first copy of the data packet on a first frequency and a second copy of the data packet on a second frequency;
   (c) transmitting the modulated first and second copies of the data packet on a powerline, wherein the modulated second copy of the data packet is shifted in time by at least one bit from the modulated first copy of the data packet;
   (d) receiving the modulated first and second copies of the data packet by a second node;
   (e) demodulating the first and second copies of the data packet; and
   (f) comparing the demodulating first and second copies of the data packet to determine if any bits of the first or second copies of the data packet was destroyed in transmission, wherein the comparing comprises:
      (f1) performing a bit-by-bit comparison of the first and second copies of the data packet, and
      (f2) determining if at least one bit of the first and second copies of the data packet is mismatched.

2. The method of claim 1, wherein the comparing step (f) comprises:
   (f1) checking parity bits of a plurality of intervals between the first and second copies of the data packet;
   (f2) determining if any of the parity bits is wrong.

3. The method of claim 1, further comprising:
   (g) reconstructing the data packet from the demodulated first and second copies of the data packet if at least one bit of the first or second copies of the data packet is determined to be destroyed in transmission; and
   (h) forwarding the reconstructed data packet.

4. The method of claim 1, further comprising:
   (g) forwarding the data packet if no bits of the first or second copies of the data packet was destroyed in transmission.

5. The method of claim 1, wherein the demodulating step (e) further comprises:
   (e1) decoding the demodulated first and second copies of the data packet.

6. A method for increasing reliability of data packet transmission against impulsive noise in powerline communication system, comprising the steps of:
   (a) constructing a data packet by a first node;
   (b) modulating a first copy of the data packet on a first frequency and a second copy of the data packet on a second frequency;
   (c) transmitting the modulated first and second copies of the data packet on a powerline, wherein the modulated second copy of the data packet is shifted in time by at least one bit from the modulated first copy of the data packet;

(d) receiving the modulated first and second copies of the data packet by a second node;

(e) demodulating the first and second copies of the data packet;

(f) comparing the demodulating first and second copies of the data packet to determine if any bits of the first or second copies of the data packet was destroyed in transmission;

(g) reconstructing the data packet from the demodulated first and second copies of the data packet if at least one bit of the first or second copies of the data packet is determined to be destroyed in transmission, wherein the reconstructing step (g) comprise:

(g1) swapping at least one bit between the first and second copies of the data packet;

(g2) performing error detection utilizing a frame check sequence of the data packet; and (g3) repeating step (g1) and (g2) if the error correction determines that an error still exists in the data packet; and (h) forwarding the reconstructed data packet.

7. A system, comprising:

a transmitting node, comprising:

a first modulator for modulating a first copy of a data packet on a first frequency, and a second modulator for modulating a second copy of the data packet on a second frequency;

a powerline coupled to the transmitting node; and a receiving node coupled to the powerline, comprising:

a first demodulator for demodulating the first copy of the data packet on the first frequency, a second demodulator for demodulating the second copy of the data packet on the second frequency, and a software or hardware coupled to the first and second demodulators, wherein the software or hardware compares the first and second copies of the data packet, determines if any bits in the first or second copies of the data packet was destroyed in transmission, and reconstructing the data packet from the first and second copies of the data packet if at least one bit of the first or second copies of the data packet was destroyed in transmission.

8. The system of claim 7, further comprising:

a first receiver coupled to the first demodulator for decoding the demodulated first copy of the data packet, and a second receiver coupled to the second demodulator for decoding the demodulated second copy of the data packet.

* * * * *